(12) United States Patent
Duduman et al.

(10) Patent No.: US 6,687,105 B2
(45) Date of Patent: Feb. 3, 2004

(54) THERMAL COMPENSATION METHOD AND DEVICE FOR CIRCUITS WITH TEMPERATURE-DEPENDENT CURRENT SENSING ELEMENTS

(75) Inventors: Bogdan M. Duduman, Raleigh, NC (US); Matthew B. Harris, Durham, NC (US); Robert H. Isham, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 10/219,556

(22) Filed: Aug. 15, 2002

(65) Prior Publication Data

US 2003/0039127 A1 Feb. 27, 2003

Related U.S. Application Data

(60) Provisional application No. 60/313,985, filed on Aug. 21, 2001.

(51) Int. Cl.[7] .................................................. H02H 7/00
(52) U.S. Cl. ........................................ 361/93.9; 361/18
(58) Field of Search ................................. 323/283, 284, 323/907; 361/18, 93.9; 327/512, 83; 324/537, 760, 721, 103 R, 105

(56) References Cited

U.S. PATENT DOCUMENTS 4,174,496 A * 11/1979 McFall et al. ............... 323/235
4,535,378 A * 8/1985 Endo .......................... 361/18
5,723,974 A   3/1998 Gray ........................... 323/282
5,982,160 A   11/1999 Walters et al. ............... 323/282

FOREIGN PATENT DOCUMENTS

EP        0 483 852        5/1992
EP        0 896 417        2/1999

OTHER PUBLICATIONS

Patent abstracts of Japan entitled "Protection Device for Inverter" published on Apr. 23, 1999. Publication No. 11113163; Applicant: Mitsubishi Electronic Corp; Inventor: Tsuchiya Eiji.

* cited by examiner

Primary Examiner—Shawn Riley
(74) Attorney, Agent, or Firm—Allen, Dyer, Doppelt, Milbrath & Gilchrist, P.A.

(57) ABSTRACT

The integrated control circuit is for an electronic circuit, such as a DC-to-DC converter, using current sense information developed across an intrinsic circuit element of the electronic circuit. The integrated control circuit includes a temperature sensor to sense a temperature rise induced by the intrinsic circuit element of the electronic circuit. The temperature error signal and a feedback signal from the intrinsic circuit element of the converter are combined to provide a temperature-corrected feedback signal to a control unit for the converter.

35 Claims, 2 Drawing Sheets

THERMAL COMPENSATION METHOD AND DEVICE FOR CIRCUITS WITH TEMPERATURE-DEPENDENT CURRENT SENSING ELEMENTS

RELATED APPLICATION

This application is based upon prior filed copending provisional application No. 60/313,985 filed Aug. 21, 2001, the entire disclosure of which is incorporated herein by reference.

FIELD OF THE INVENTION

The present invention relates to the field of electronic circuits, and more particularly, to DC-DC converters and associated methods.

BACKGROUND OF THE INVENTION

Typically, DC-DC converters use current flow information to provide value added functions and features. For example, limiting the current during an overload is commonly implemented as a safety feature. Such a current limit feature would use a signal proportional to output current limiting level. A resistor inserted between the output and the load could generate the desired temperature-independent feedback signal. However, the resistance of this sensor is the subject of a trade-off between power dissipation and signal amplitude. Typically, the signal level at current limit is approximately 0.1 volt, to be well above the noise floor. The sensing resistor's power dissipation is proportional to the load current at the limit level. At high current levels, the power dissipation can be excessive.

Eliminating the sensing resistor improves the DC-DC converter's efficiency. Instead of an additional resistive element, current flow is measured using the intrinsic elements within the power converter components. For example, U.S. Pat. No. 5,982,160 to Walters et al. and entitled "DC-to-DC converter with inductor current sensing and related methods" teaches that the current flow information in an inductor can be reconstructed as a voltage across a resistor-capacitor network. This method uses the intrinsic resistance of the inductor's winding as the current sensing element.

Another method to eliminate the current sensing resistor measures the voltage dropped across the nearly constant, on-state resistance of one of the switching MOSFETs in the converter. The method samples the voltage drop during the conduction of interval of the MOSFET to reconstruct the current flow information. Both of these methods make use of the fundamental power converter components as current sensing elements and they avoid using a dissipative element in the power path.

A problem with the use of intrinsic elements is the variation of their conductivity with temperature. Copper (the most popular material used in fabrication of electronic conductors and magnetic windings) has a resistivity temperature of coefficient of 0.0039/° C. Similarly, the channel region of a MOSFET transistor also exhibits a positive temperature coefficient whose variation with temperature can often be approximated using a straight line. The slope varies with the technology used, interpolating to a temperature coefficient of 0.0041/° C. to 0.0065/° C. (considering select technologies from several contemporary MOSFET manufacturers).

As current travels through these circuit elements, it generates heat proportional to its magnitude. In most systems, and specific to electronic power converters, the controlling circuit is never situated too far away from these power elements. The heat generated in the power elements (also used for sensing purposes) heats up the surrounding areas, the controlling circuit and ultimately, the local ambient temperature, as well.

SUMMARY OF THE INVENTION

In view of the foregoing background, it is therefore an object of the invention to reduce or eliminate the thermal effects present in intrinsic circuit elements used to sense various parameters in electronic circuits.

This and other objects, features and advantages in accordance with the present invention are provided by an integrated control circuit for an electronic circuit, such as a DC-to-DC converter, using current sense information developed across an intrinsic circuit element of the electronic circuit. The integrated control circuit includes a control unit to control the electronic circuit, and a temperature sensor to sense a temperature rise induced by the intrinsic circuit element of the electronic circuit and output a temperature error signal. A variable gain amplifier is connected to the temperature sensor to generate an amplified temperature error signal, and an adder is connected to the variable gain amplifier to combine the amplified temperature error signal and a feedback signal from the intrinsic circuit element of the converter, and to provide a temperature-corrected feedback signal to the control unit.

The intrinsic circuit element is preferably an output inductor or a power switch of a DC-to-DC converter. The power switch would typically be a power field effect transistor (FET) and the current sense information is measured as the voltage dropped across the on-state resistance of the power FET. Preferably, the adder eliminates an induced temperature error from the feedback signal thereby creating a temperature-independent feedback signal. Also, the gain of the variable gain amplifier may be adjustable via an external adjustment circuit.

Alternatively, the temperature sensor may have a positive temperature coefficient and sense a temperature rise induced by the intrinsic circuit element of the electronic circuit. Here, an amplifier receives a feedback signal from the intrinsic circuit element of the electronic circuit and the temperature error signal from the temperature sensor to generate a temperature-corrected feedback signal to the control unit. The amplifier preferably eliminates an induced temperature error from the feedback signal to generate a temperature-independent feedback signal. Also, the temperature sensor may receive an adjustment signal from an external adjustment circuit.

Another aspect of the present invention relates to method of regulating a DC-to-DC converter as described above. The method includes sensing current in an intrinsic circuit element, such as the output inductor or the power switch, of the converter. The current feedback loop circuit is operated in cooperation with the pulse width modulation circuit to control the at least one power switch in response to the current sensor. The method further includes generating a temperature error signal by sensing a temperature rise induced by the intrinsic circuit element of the converter, and providing a temperature-corrected feedback signal to the pulse width modulation circuit by combining the temperature error signal and a feedback signal from the current feedback loop circuit.

Also, the temperature error signal may be amplified with a variable gain amplifier connected to the temperature sensor. Providing the temperature-corrected feedback signal preferably includes eliminating an induced temperature error from the feedback signal to provide a temperature-independent feedback signal.

Alternatively, the method may include generating a temperature error signal by sensing a temperature rise induced by the intrinsic circuit element of the converter with a temperature sensor having a positive temperature coefficient, and generating a temperature-corrected feedback signal to the pulse width modulation circuit based upon a feedback signal from the current feedback loop circuit and the temperature error signal from the temperature sensor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
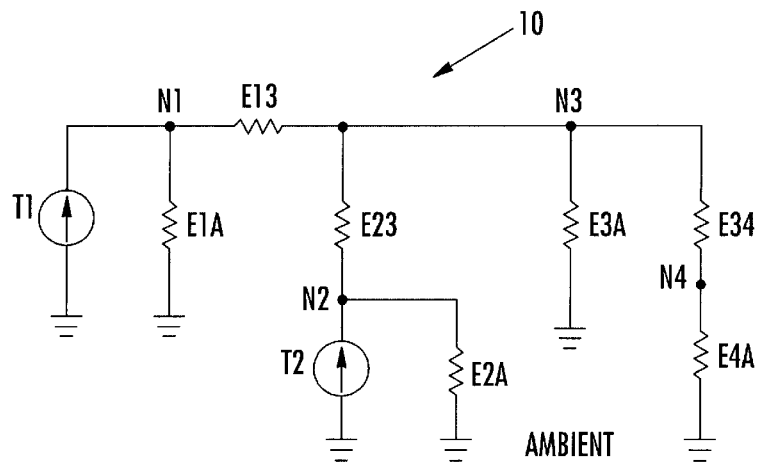
FIG. 1 is a schematic diagram of a thermal system representing the use of fundamental power converter components as current sensing elements.

FIG. 1 depicts a simplified diagram of a thermal system 10 representing the use of fundamental power converter components as current sensing elements. Heat generator, T1, could represent a MOSFET switch, while T2, could represent an output inductor. As the energy (heat) generated by the two sources is emitted, it travels toward low-temperature areas through the surrounding system 10, following the path of lowest thermal resistance. The controlling circuit could be represented by the element E34 in FIG. 1. As T1 and T2 are magnitude-related (both sources carrying a fraction or the full magnitude of the current to be monitored), and given the linearity of the system 10, it can be inferred that the temperature rise sensed at circuit node N3 by the element E34 is a linear fraction of the heat generated by the combination of the two sources. This conclusion is based on the assumption that the controlling circuit itself does not dissipate power, or that the power dissipated by the controlling circuit is of sufficiently small magnitude as to have an insignificant contribution to the system. The control circuit can thus sense a fraction of the heat rise induced by the sensing element.

The invention seeks to reduce or eliminate the thermal effects present in intrinsic circuit elements used to sense various parameters in electronic circuits. Thus, referring to FIGS. 2 and 3, the present invention is directed to an integrated control circuit 20, 20' for an electronic circuit, such as a DC-to-DC converter, using current sense information developed across an intrinsic circuit element of the electronic circuit. For example, as would be appreciated by those skilled in the art, a DC-to-DC converter typically includes one or more power switches, a pulse width modulation circuit (depicted as control circuit 32) for generating control pulses for the power switches, and an output inductor connected between the power switches and an output terminal. A current sensor senses current in the output inductor. Also, a current feedback loop circuit (depicted as feedback circuit 28) cooperates with the pulse width modulation circuit to control the power switches responsive to the current sensor.

The intrinsic circuit element of the converter is preferably the output inductor or one of the power switches. Such a power switch would typically be a power field effect transistor (FET) and the current sense information is measured as the voltage dropped across the on-state resistance of the power FET.

Figure 2:
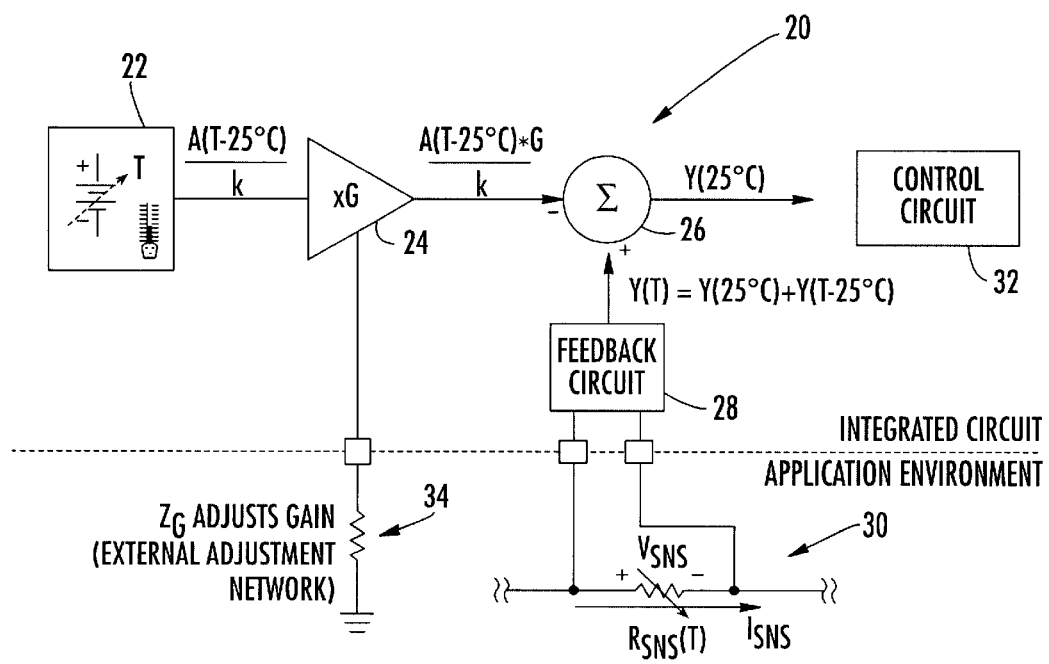
FIG. 2 is a schematic diagram illustrating an integrated control circuit in accordance with the present invention.
Figure 3:
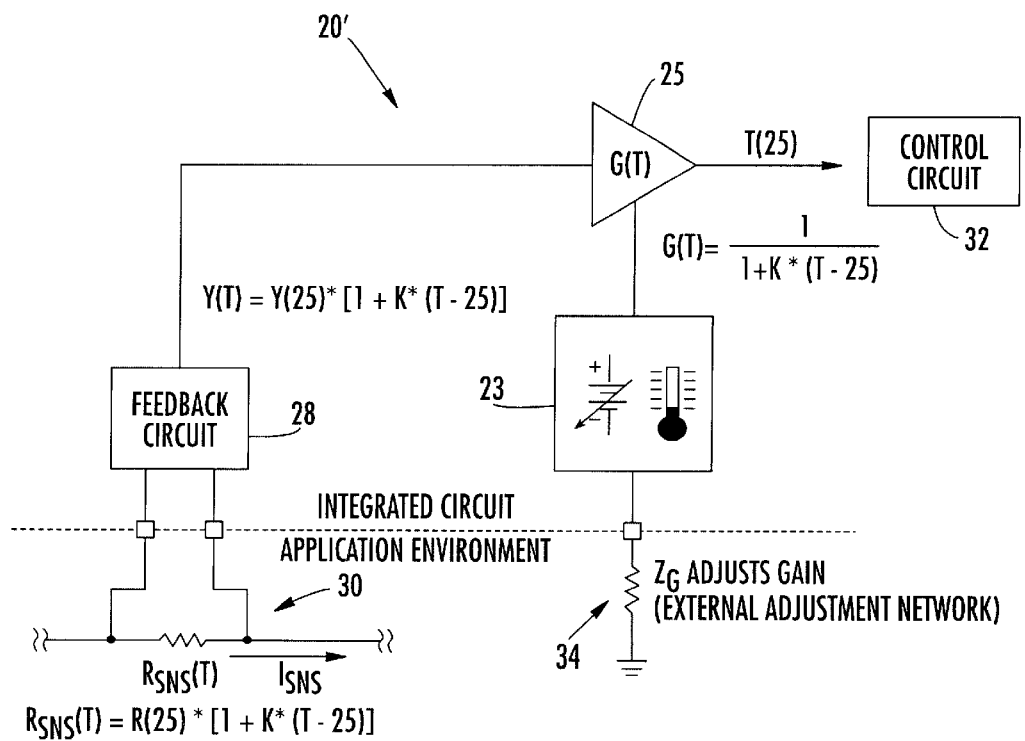
FIG. 3 is a schematic diagram illustrating another embodiment of an integrated control circuit in accordance with the present invention.

Referring to FIG. 2, a first embodiment of the integrated control circuit 20 of the present invention will now be described. A temperature sensor 22 is present on the controlling circuit die to measure the temperature rise, its output being A multiplied by a factor proportional to the sensed temperature rise (e.g. the temperature difference between sensed ambient at node N3 in FIG. 1, and a fixed reference, in this case 25° C.). In this embodiment, the signal coming out of the temperature sensor 22 is amplified in a variable gain block 24, which may be externally set by an impedance circuit 34. The externally-set, variable gain is needed to provide application flexibility, as the fractional temperature rise experienced by the controlling circuit 32 can, and will, vary in different physical implementations.

The amplified temperature information can then be added, via adding circuit 26, to the feedback information coming from the temperature-affected sensing element 30 via feedback circuit 28. Under the effects of temperature rise, the feedback signal can be de-composed into two elements: the value of the signal at the reference temperature Y(25° C.), and the induced temperature error Y(T-25° C.). Total elimination of the temperature-induced sensed signal error can be achieved if the following equation is met: A(T-25° C.)×G/k=Y(T-25° C.). Preferably, the adder eliminates an induced temperature error from the feedback signal thereby creating a temperature-independent feedback signal provided to the control circuit 32.

It should be noted that none of the signals are identified as voltages, currents, or impedances of any kind, as the various blocks can be implemented in different ways as would be appreciated by those skilled in the art.

Alternatively, the temperature sensor 23 may have a positive temperature coefficient and sense a temperature rise induced by the intrinsic circuit element of the electronic circuit. Here, an amplifier 25 receives a feedback signal, via feedback circuit 28, from the intrinsic circuit element of the electronic circuit and the temperature error signal from the temperature sensor 23 to generate a temperature-corrected feedback signal to the control unit 32. The amplifier 25 preferably eliminates an induced temperature error from the feedback signal to generate a temperature-independent feedback signal. Also, the temperature sensor may receive an adjustment signal from an external adjustment circuit 34.

In the second embodiment (FIG. 3), the temperature sensitive resistor $R_{SNS}(T)$ of the sensing element 30 is expressed as being proportional to its nominal value, $R_{SNS}(25)$. For convenience the nominal value of $R_{SNS}(T)$ is chosen to be the value at 25° C. so that: $R_{SNS}(T)=R_{SNS}(25)\times[1+k\times(T-25°\ C.)]$. In this case, the output of the control variable, Y(T), is also proportional to its 25° C. value, Y(25), so that: $Y(T)=Y(25)\times[1+k\times(T-25°\ C.)]$. The integrated temperature sensor 23 has a positive temperature coefficient and produces an output that is directly proportional to temperature. The proportionality constant, k, can be selected by the external impedance network 34 connected to the temperature sensor 23. As with the first embodiment, the temperature effects on the sense element 30 will be completely nullified provided the gain is chosen properly.

Another aspect of the present invention relates to a method of regulating a DC-to-DC converter as described above. The method includes sensing current in an intrinsic circuit element, such as the output inductor or the power switch, of the converter. The current feedback loop circuit 28 is operated in cooperation with the pulse width modulation circuit or control unit 32 to control the power switches in response to the current sensor 30. The method further includes generating a temperature error signal by sensing a temperature rise induced by the intrinsic circuit element of the converter, and providing a temperature-corrected feedback signal to the pulse width modulation circuit or control unit 32 by combining the temperature error signal and a feedback signal from the current feedback loop circuit.

Also, the temperature error signal may be amplified with a variable gain amplifier 24 connected to the temperature sensor 22. Providing the temperature-corrected feedback signal preferably includes eliminating an induced temperature error from the feedback signal to provide a temperature-independent feedback signal.

Alternatively, the method may include generating a temperature error signal by sensing a temperature rise induced by the intrinsic circuit element of the converter with a temperature sensor 23 (FIG. 3) having a positive temperature coefficient, and generating a temperature-corrected feedback signal to the pulse width modulation circuit or control unit 32 based upon a feedback signal from the current feedback loop circuit 28 and the temperature error signal from the temperature sensor 23.

Thus, the above described embodiments of the present invention reduce or eliminate the thermal effects present in intrinsic circuit elements, such as output inductors or power FETs, used to sense various parameters, such as current, in electronic circuits, such as DC-to-DC converters.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. An integrated control circuit for an electronic circuit using current sense information developed across an intrinsic circuit element of the electronic circuit, the integrated control circuit comprising:
   a control unit to control the electronic circuit;
   a temperature sensor to sense a temperature rise induced by the intrinsic circuit element of the electronic circuit and output a temperature error signal;
   a variable gain amplifier connected to the temperature sensor to generate an amplified temperature error signal; and
   an adder connected to the variable gain amplifier to combine the amplified temperature error signal and a feedback signal from the intrinsic circuit element of the converter, and to provide a temperature-corrected feedback signal to the control unit.

2. An integrated control circuit according to claim 1 wherein the electronic circuit comprises a DC-to-DC converter and the intrinsic circuit element of the converter comprises an output inductor.

3. An integrated control circuit according to claim 1 wherein the electronic circuit comprises a DC-to-DC converter and the intrinsic circuit element of the converter comprises a power switch.

4. An integrated control circuit according to claim 3 wherein the power switch comprises a power field effect transistor (FET) and the current sense information is measured as the voltage dropped across the on-state resistance of the power FET.

5. An integrated control circuit according to claim 1 wherein the adder eliminates an induced temperature error from the feedback signal, and the temperature-corrected feedback signal comprises a temperature-independent feedback signal.

6. An integrated control circuit according to claim 1 wherein the gain of the variable gain amplifier is adjustable via an external adjustment circuit.

7. An integrated control circuit for an electronic circuit using current sense information developed across an intrinsic circuit element of the electronic circuit, the integrated control circuit comprising:
   a control unit to control the electronic circuit;
   a temperature sensor to sense a temperature rise induced by the intrinsic circuit element of the electronic circuit and output a temperature error signal, the temperature sensor having a positive temperature coefficient; and
   an amplifier to receive a feedback signal from the intrinsic circuit element of the electronic circuit and the temperature error signal from the temperature sensor to generate a temperature-corrected feedback signal to the control unit.

8. An integrated control circuit according to claim 7 wherein the electronic circuit comprises a DC-to-DC converter and the intrinsic circuit element of the converter comprises an output inductor.

9. An integrated control circuit according to claim 7 wherein the electronic circuit comprises a DC-to-DC converter and the intrinsic circuit element of the converter comprises a power switch.

10. An integrated control circuit according to claim 9 wherein the power switch comprises a power field effect transistor and the current sense information is measured as the voltage dropped across the on-state resistance of the power FET.

11. An integrated control circuit according to claim 1 wherein the amplifier eliminates an induced temperature error from the feedback signal, and the temperature-corrected feedback signal comprises a temperature-independent feedback signal.

12. An integrated control circuit according to claim 1 wherein the temperature sensor receives an adjustment signal from an external adjustment circuit.

13. A DC-to-DC converter comprising:
   at least one power switch;
   a pulse width modulation circuit for generating control pulses for the at least one power switch;
   an output inductor connected to the at least one power switch;
   a current sensor for sensing current in an intrinsic circuit element of the converter, the intrinsic circuit element comprising one of the output inductor and the at least one power switch;

a current feedback loop circuit cooperating with the pulse width modulation circuit for controlling the at least one power switch responsive to the current sensor;

a temperature sensor to sense a temperature rise induced by the intrinsic circuit element of the converter and output a temperature error signal;

a variable gain amplifier connected to the temperature sensor to generate an amplified temperature error signal; and an adder connected to the variable gain amplifier to combine the amplified temperature error signal and a feedback signal from the current feedback loop circuit, and to provide a temperature-corrected feedback signal to the pulse width modulation circuit.

14. A DC-to-DC converter according to claim 13 wherein the intrinsic circuit element of the converter comprises the output inductor.

15. A DC-to-DC converter according to claim 13 wherein the intrinsic circuit element of the converter comprises the at least one power switch.

16. A DC-to-DC converter according to claim 15 wherein the at least one power switch comprises a power field effect transistor (FET) and the current sense information is measured as the voltage dropped across the on-state resistance of the power FET.

17. A DC-to-DC converter according to claim 13 wherein the adder eliminates an induced temperature error from the feedback signal, and the temperature-corrected feedback signal comprises a temperature-independent feedback signal.

18. A DC-to-DC converter according to claim 13 further comprising an impedance circuit to adjust the gain of the variable gain amplifier.

19. A DC-to-DC converter comprising:
at least one power switch;
a pulse width modulation circuit for generating control pulses for the at least one power switch;
an output inductor connected to the at least one power switch;
a current sensor for sensing current in an intrinsic circuit element of the converter, the intrinsic circuit element comprising one of the output inductor and the at least one power switch;
a current feedback loop circuit cooperating with the pulse width modulation circuit for controlling the at least one power switch responsive to the current sensor;
a temperature sensor to sense a temperature rise induced by the intrinsic circuit element of the converter and output a temperature error signal, the temperature sensor having a positive temperature coefficient; and
an amplifier to receive a feedback signal from the current feedback loop circuit and the temperature error signal from the temperature sensor to generate a temperature-corrected feedback signal to the pulse width modulation circuit.

20. A DC-to-DC converter according to claim 19 wherein the intrinsic circuit element of the converter comprises the output inductor.

21. A DC-to-DC converter according to claim 19 wherein the intrinsic circuit element of the converter comprises the at least one power switch.

22. A DC-to-DC converter according to claim 21 wherein the at least one power switch comprises a power field effect transistor (FET) and the current sense information is measured as the voltage dropped across the on-state resistance of the power FET.

23. A DC-to-DC converter according to claim 19 wherein the amplifier eliminates an induced temperature error from the feedback signal, and the temperature-corrected feedback signal comprises a temperature-independent feedback signal.

24. A DC-to-DC converter according to claim 13 further comprising an impedance circuit providing an adjustment signal to the temperature signal.

25. A method of regulating a DC-to-DC converter comprising an output terminal, at least one power switch, a pulse width modulation circuit for generating control pulses for the at least one power switch, an output inductor connected between the at least one power switch and the output terminal, and a current feedback loop circuit cooperating with the pulse width modulation circuit for controlling the at least one power switch, the method comprising:
sensing current in an intrinsic circuit element of the converter, the intrinsic circuit element comprising one of the output inductor and the at least one power switch;
operating the current feedback loop circuit in cooperation with the pulse width modulation circuit to control the at least one power switch in response to the current sensor;
generating a temperature error signal by sensing a temperature rise induced by the intrinsic circuit element of the converter; and
providing a temperature-corrected feedback signal to the pulse width modulation circuit by combining the temperature error signal and a feedback signal from the current feedback loop circuit.

26. A method according to claim 25 further comprising generating an amplified temperature error signal with a variable gain amplifier connected to the temperature sensor.

27. A method according to claim 25 wherein the intrinsic circuit element of the converter comprises the output inductor.

28. A method according to claim 25 wherein the intrinsic circuit element of the converter comprises the at least one power switch.

29. A method according to claim 28 wherein the at least one power switch comprises a power field effect transistor (FET) and the current sense information is measured as the voltage dropped across the on-state resistance of the power FET.

30. A method according to claim 25 wherein providing a temperature-corrected feedback signal comprises eliminating an induced temperature error from the feedback signal to provide a temperature-independent feedback signal.

31. A method of regulating a DC-to-DC converter comprising at least one power switch, a pulse width modulation circuit for generating control pulses for the at least one power switch, an output inductor connected to the at least one power switch, and a current feedback loop circuit cooperating with the pulse width modulation circuit for controlling the at least one power switch, the method comprising:
sensing current in an intrinsic circuit element of the converter, the intrinsic circuit element comprising one of the output inductor and the at least one power switch;
operating the current feedback loop circuit in cooperation with the pulse width modulation circuit to control the at least one power switch in response to the current sensor;
generating a temperature error signal by sensing a temperature rise induced by the intrinsic circuit element of the converter with a temperature sensor having a positive temperature coefficient; and
generating a temperature-corrected feedback signal to the pulse width modulation circuit based upon a feedback signal from the current feedback loop circuit and the temperature error signal from the temperature sensor.

32. A method according to claim 31 wherein the intrinsic circuit element of the converter comprises the output inductor.

33. A method according to claim 31 wherein the intrinsic circuit element of the converter comprises the at least one power switch.

34. A method according to claim 33 wherein the at least one power switch comprises a power field effect transistor (FET) and the current sense information is measured as the voltage dropped across the on-state resistance of the power FET.

35. A method according to claim 31 wherein providing a temperature-corrected feedback signal comprises eliminating an induced temperature error from the feedback signal to provide a temperature-independent feedback signal.

* * * * *